Oct. 20, 1970      M. E. GILWOOD      3,535,234

SEWAGE TREATMENT PROCESS AND APPARATUS

Filed Feb. 20, 1968      3 Sheets-Sheet 1

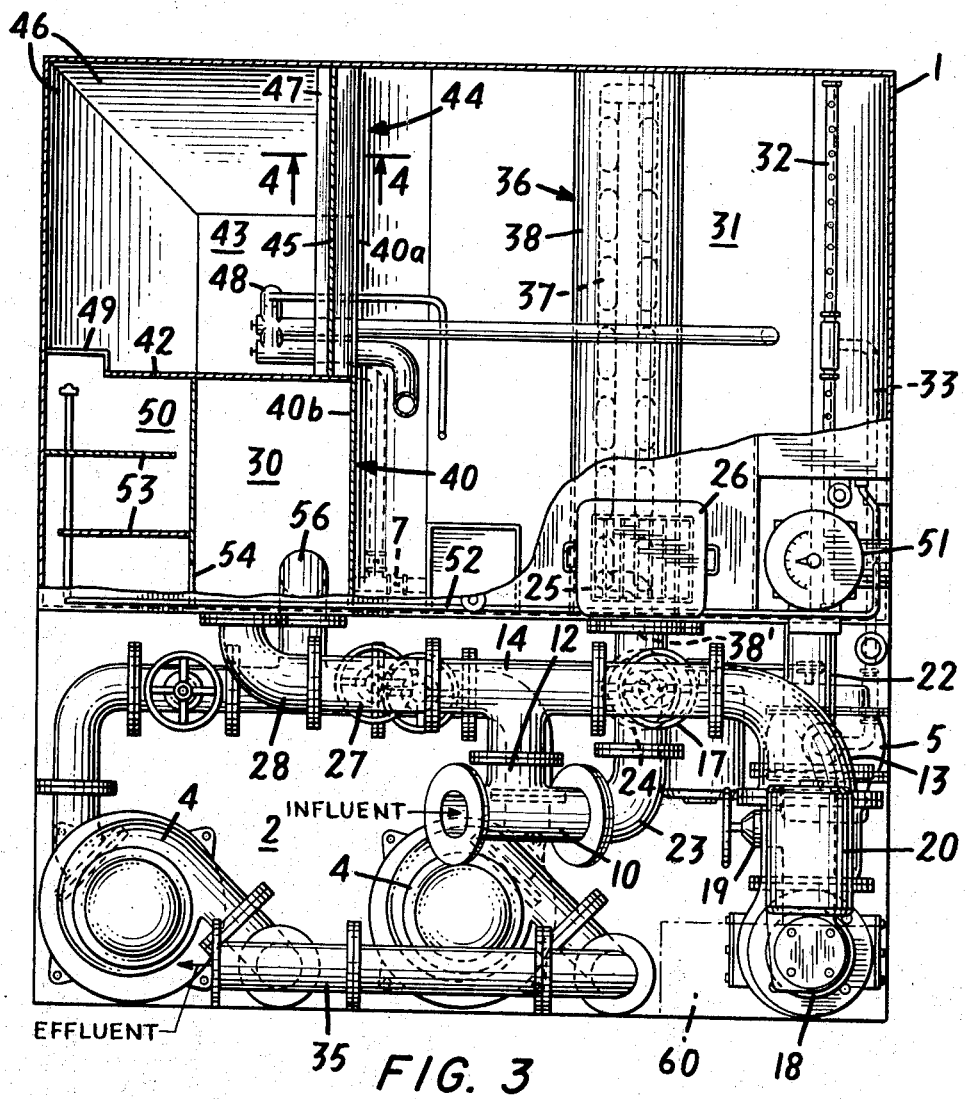
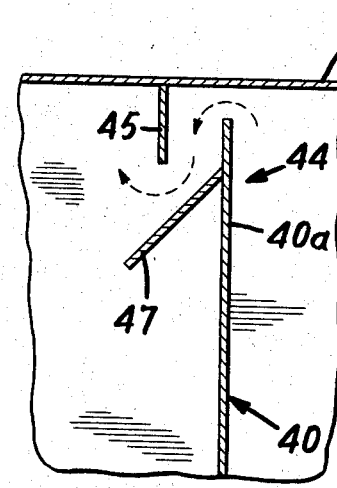

United States Patent Office 3,535,234
Patented Oct. 20, 1970

1

3,535,234
SEWAGE TREATMENT PROCESS
AND APPARATUS
Martin E. Gilwood, New Brunswick, N.J., assignor to Pall Corporation, Glen Cove, N.Y., a corporation of New York
Filed Feb. 20, 1968, Ser. No. 706,932
Int. Cl. C02c 1/06
U.S. Cl. 210—7                                      19 Claims

ABSTRACT OF THE DISCLOSURE

An activated sludge sewage treatment process and apparatus are provided in which elevated temperatures are employed in the aeration zone and preferably additionally in the sedimentation zone. The elevated temperature provides greatly increased efficiency which make the process and apparatus suitable for use on a marine vessel.

---

This invention relates to an apparatus and process for rendering sewage suitable for disposal and more particularly it relates to a process and apparatus in which sewage is efficiently treated by modified activated sludge process in a manner such that little space is required to process a relatively large volume of sewage.

Recently, the concern over the ever increasing pollution of inland waterways and lakes has led to the enactment of pollution control laws which require that the sewage discharged from vessels over 40 persons in capacity must be disinfected to below 1,000 coliforms/100 ml. m.p.n. of water and have a minimum 80 percent reduction in BOD (Biochemical Oxygen Demand).

One of the simplest and most efficient processes for reducing the BOD of sewage is the activated sludge process. This is a process in which incoming sewage is vigorously aerated to promote the growth of aerobic microorganisms in the sewage. This results in the digestion of the sewage by the microorganisms and a consequent reduction in the BOD of the sewage. Often, the incoming sewage mixture is clarified prior to being aerated. The aeration of the sewage mixture and the vigorous mixing can be further used to break down the size of suspended solids and thus facilitate the rapid digestion of the sewage. The suspended biologically active mass forms a sludge which is separated from the treated liquid effluent by sedimentation. The clarified effluent is then disinfected before discharge to control the concentration level of the remaining microorganisms. The microorganism colony in the aeration zone is supplemented with microorganisms by recirculating the sludge separated from the effluent during clarification into the aeration zone.

As indicated above, this has proved to be quite an efficient sewage treatment system. Many variations of the activated sludge process have been developed in attempts to make the process even more efficient. For example, one variation employs a lengthy detention time (24 hours or more in the aeration tank and dispenses with the primary settling operation. This variation is known as extended aeration. The principal advantage of the extended aeration process is that the buildup of the suspended biologically active mass is limited. In the ordinary activated sludge process the biologically active mass tends to accumulate over a short period of time and must be in some manner reduced or disposed of. In the extended aeration process due to the long detention time the microorganisms undergo endogenous digestion, i.e., they metabolize their own cells. This reduces the amount of biologically active mass and eliminates the need to remove such material. Furthermore, the long aeration period also tends to more efficiently break down solids and thus eliminates the need for primary settling. A further and also very significant advantage of the extended aeration process is that it is simple and employs only basic sewage treatment operations without requiring complex mechanisms and skilled operators. The principal drawback of the extended aeration process has been a relatively long time required to render sewage suitable for disposal. Thus, in order to retain the large volume sewage that accumulates during this relatively long period, a large storage reservoir is required.

Consequently, extended aeration has not generally been used on marine vessels since the use of such a process would require a loss of cargo space and unduly add to the unloaded weight of the vessel. Furthermore, it is quite difficult to refit an existing vessel with an extended aeration sewage plant due to the space limitations.

Other variations of the activated sludge process have been designed with the object of reducing the size of the treatment apparatus without reducing the capacity, but these involved many complications which, although permitting smaller apparatus, also increased the frequency of breakdowns and maintenance and require the attention of a skilled operator. These variations were quite substantial departures from the basic activated sludge process and the extended aeration variation thereof and did not provide the trouble-free operation of these two systems.

One such aerobic sewage treatment system, which is compact and suitable for marine use, is shown in U.S. Pat. No. 3,337,448 to Rich. In this system, the clarification operation is entirely eliminated in order to reduce the size of the apparatus. Clarification, normally carried out by sedimentation, is desirable since it ensures that suspended particles and microorganisms cannot escape. This is important, since without clarification the suspended matter concentration of the effluent cannot be reduced to less than the concentration level of the microorganisms that are contained in the effluent, and a clear effluent cannot be obtained.

Another sewage treatment system which is suitable for marine use, is shown in U.S. Pat. No. 3,335,865 to Cawley et al. It employs what Cawley et al. term an extended aeration process in combination with a trickling filter. The system shown employs two Imhoff-type tank units, each of which carries out both digestion of sewage and clarification. The Imhoff-type tank is normally used as a complete sewage treatment system in itself. The ttreatment of the sewage in the Imhoff tank is not the same as is exended aeration process since the order of the aeration and clarification steps are reversed, i.e. clarification precedes digestion. In Cawley's device one Imhoff tank is employed as a primary clarifier and digester. The clarified effluent (which is separted from the sludge before digestion takes place) is transported to a trickling filter for biological oxidation. The effluent of the trickling filter is further processed by a second Imhoff tank in which both clarification and digestion again take place. The effluent from the secondary Imhoff tank is then chlorinated and discharged. It is to be noted that although Cawley et al. system provides relatively effective sewage treatment it is quite complex. The Cawley et al. systems requires an elaborate network of bypasses, valves, and switching apparatus which control the flow to and from the biological oxidizing filter and the Imhoff tanks, to ensure that the system is no overloaded and that flow is recirculated to and from the oxidizing tower and the Imhoff tanks. The numerous compenents of the system require a good deal of space and the complexity of the system described in the Cawley et al. patent constitutes a departure from the simplicity and efficiency of the basic extended aeration process with Cawley et al. claim to employ.

Still another sewage treatment system adapted for marine sewage disposal is shown by Kappe in U.S. Pat. No. 3,347,784. Kappe discloses a compact sewage treatment system which employs a variation of the activated sludge sewage treatment method known as contact stabilization. The system shown by Kappe employs aeration of influent sewage and sedimentation to clarify the effluent and further employs "re-aeration" of sludge separated from the effluent in the aeration zone. The sludge is "re-aerated" in a "re-aeration zone" and is then recirculated back to the primary aeration zone for mixing with influent sewage. The re-aeration of sludge is designed to provide a highly activated sludge by concentrating the sludge and promoting the growth of the microorganisms therein. The difference between contact stabilization and a simple activated sludge process such as the extended aeration process, is that in contact stabilization the return of sludge must be carefully controlled according to the sewage input load, whereas in an extended aeration system this is not necessary. In extended aeration all sludge is continually recirculated to maintain biological activity, and older sludge cells are self-oxidized and the residue is constantly expelled from the system in small quantities which do not significantly affect the solids count of the effluent. In addition, although contact stabilization provides efficient sewage treatment, it tends to develop great amounts of sludge which must eventually be disposed of and, in a contact stabilization system such as Kappe's there must be an additional chamber provided for sludge re-aeration.

It has been found, in accordance with this invention, that in activated sludge process by the application of heat during aeration and also preferably during sedimentation, it is possible to increase the efficiency of sewage treatment and thus substantially reduce the size of an activated sludge treatment apparatus, this in turn makes it possible to employ a simple activated sludge process on marine vessels without the necessity of sacrificing a desirable treatment operation such as clarification. No additional treatment systems such as a biological trickling filter or a re-aeration chamber, are required and skilled personnel are not needed.

In fact, it has been found that by employing the elevated temperatures specified herein, the size of the apparatus for a given sewage capacity can be reduced by more than two-thirds to three-quarters.

The process of this invention accordingly comprises, aerating a sewage mixture in an aeration zone while heating the mixture at a temperature within the range from about 35° C. to about 55° C. to promote the growth of microorganisms therein and substantially reduce the BOD of the mixture; continuously withdrawing a portion of said mixture and clarifying said portion of the mixture while at an elevated temperature within said range in a sedimentation zone by sedimenting out of the mixture the suspended microorganisms in the mixture in the form of sludge leaving a clarified effluent; drawing off the clarified effluent from the sedimentation zone; collecting sludge separated from said clarified effluent during sedimentation; recirculating at least a portion of said sludge into the aeration zone; and disinfecting said clarified effluent.

This invention also provides a sewage treatment apparatus for which comprises, in combinaiton, a housing, an aeration chamber in the housing for receiving a quantity of sewage, means for introducing air under pressure into the aeration chamber to aerate the sewage mixture; means for heating the aerated sewage mixture in the aeration chamber to an elevated temperature within the range from about 35° C. to about 55° C. tp promote the growth of microorganisms in the mixtures and reduce the BOD of the mixture; a sedimentation chamber in the housing adjacent to the aeration chamber, for the separation from mixture in the form of sludge the microorganisms suspended therein while the mixture is at an elevated temperature within said range leaving a clarified effluent; said sedimentation chamber communicating with the aeration chamber in a manner to receive a portion of the heated aerated sewage mixture therefrom with a minimum of heat loss; means for recirculating the sludge separated from the effluent in the sedimentation chamber to the aeration chamber,means for withdrawing the clarified effluent; and means for disinfecting the clarified effluent for discharge.

By the process and apparatus defined above, sewage can be disposed of overboard after only 8 hours. This is in contrast to the treatment time required in an ordinary unheated extended aeration process in which a treatment time of 24 hours is required. It is also possible for a given volume of sewage to reduce the size of the apparatus to one-third to one-quarter of that normally employed for extended aeration. In fact, the instant process and apparatus are capable of processing more than 4 gallons of sewage per day per cubic foot of space occupied. This is to be compared to conventional extended aeration apparatus which are capable of processing only about 1 gallon of sewage per day per cubic foot of space occupied. Moreover, the concentration of suspended solids in the effluent can be extremely low as compared to a system such as shown in U.S. Pat. No. 3,337,448 to Rich and no re-aeration of sludge is required such as is required in the system shown by Kappe in U.S. Pat. No. 3,347,784.

The instant invention will be described more particularly in connection with the following drawings in which;

FIG. 3 is a top view thereof, and with the top wall of the apparatus removed for clarity;

FIG. 4 is an enlarged view of a portion of the apparatus shown in FIGS. 1 and 3.

Figure 1:
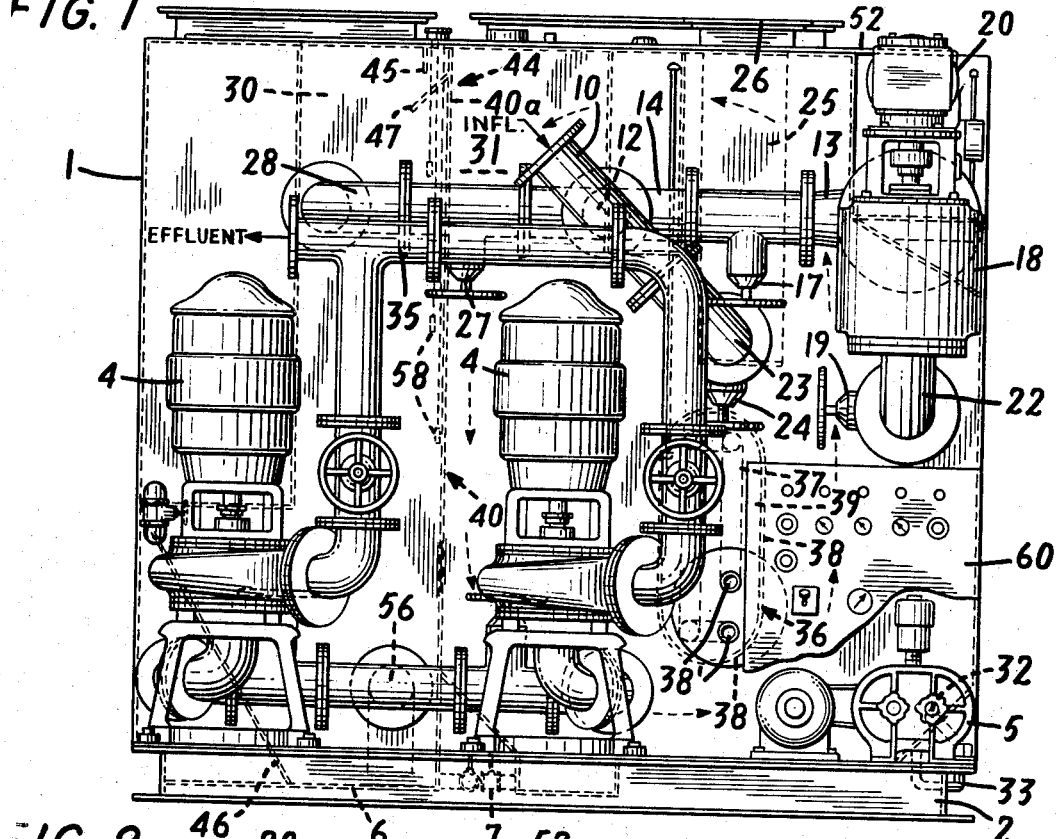
FIG. 1 is a front elevational view of a sewage treatment apparatus in accordance with this invention.
Figure 2:
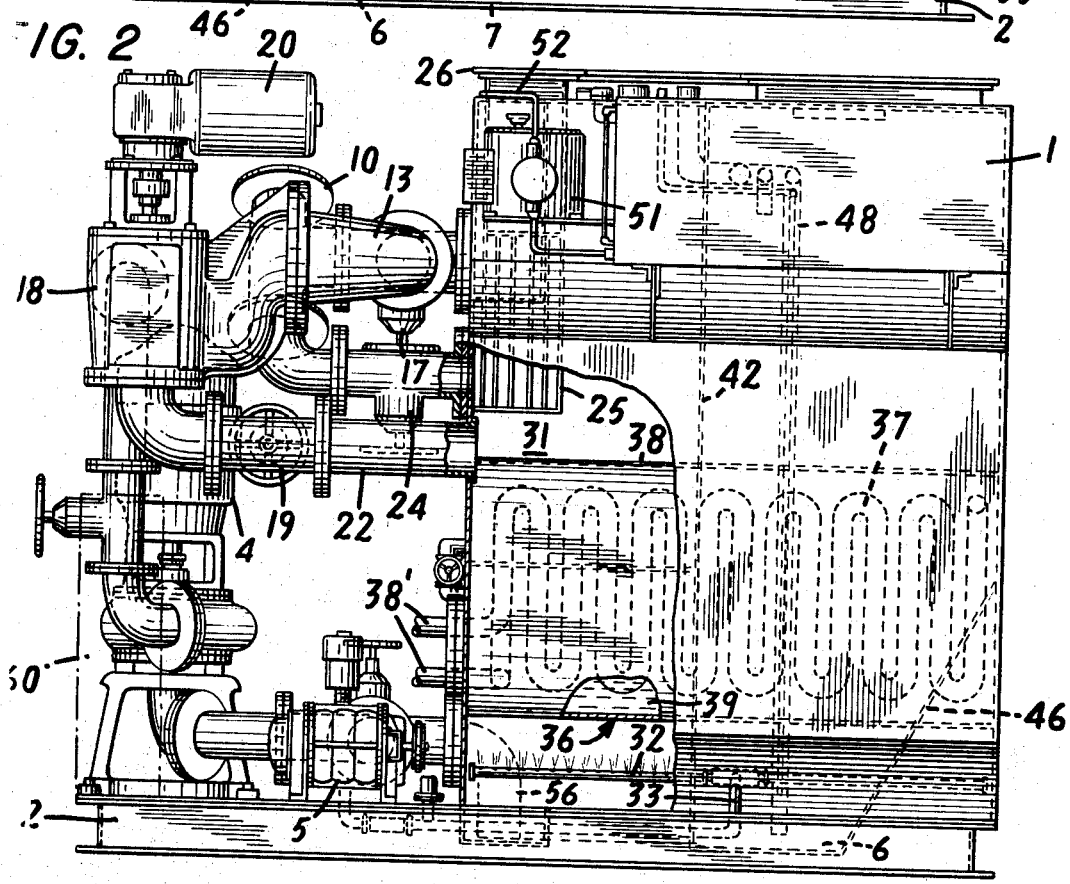
FIG. 2 is a side elevational view thereof.
Figure 5:
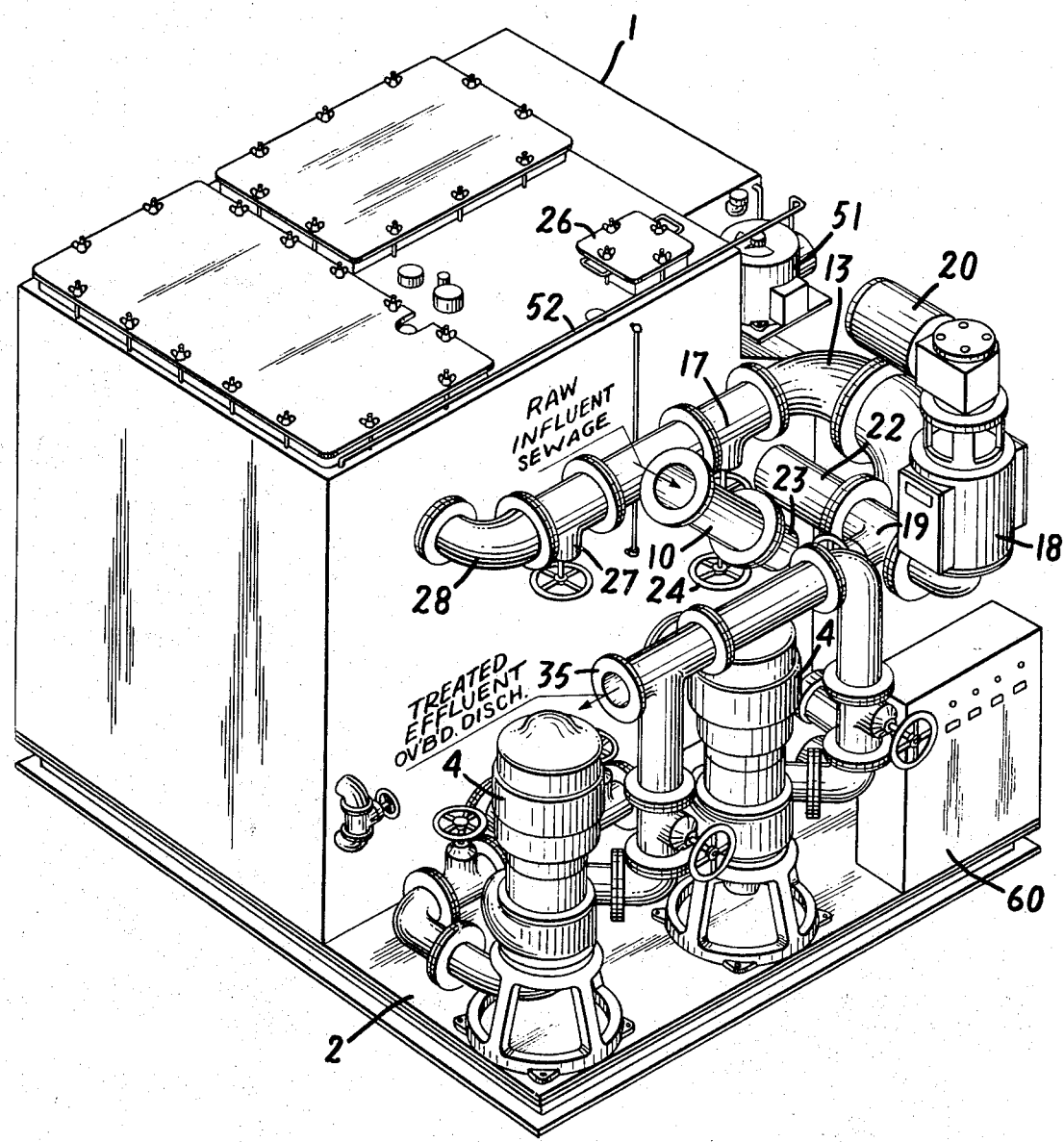
FIG. 5 is a view in perspective of the apparatus.

In FIGS. 1 through 4 described above, portions of the apparatus hidden by the exterior walls thereof are shown in broken lines, to aid in a clearer understanding of the invention.

As indicated above, it is possible to employ a simple activated sludge process in a compact apparatus by heating the sewage mixture in both the aeration and clarification zones. This accelerates the biological oxidation of the organic sewage matter in the aeration zone to reduce the BOD and the solid matter content of the sewage. It has also been found that the self oxidation, or endogenous digestion of the microorganisms, is also promoted by heating the mixture in the aeration zone. Thus, the benefit of the extended aeration process in having extremely little or no sludge buildup is obtained by this invention with a far less lengthy treatment time. This is accomplished without significantly affecting the simplicity of the system. The instant process can in fact, be termed an "accelerated extended aeration sewage treatment system." The required detention time for the sewage treatment is reduced to one third that of a conventional extended aeration system. Moreover, the heated aerated mixture has decreased viscosity, thus rapid settling in the sedimentation zone is also promoted. Therefore, the size of the sedimentation zone can also be reduced, thus reducing the overall size of the sewage treatment apparatus greatly, while retaining the benefits of sedimentation.

The temperatures to be maintained to provide the improved result in the sewage mixture during aeration and sedimentation are within the range from about 35° C. to about 55° C. Temperatures within the range from about 40° C. to about 50° C. are preferred since they provide the most substantial reduction in treatment time. If the temperatures fall below those specified above, there will be little improvement noted. Moreover, if the temperatures exceed those specified above, a decrease in efficiency will be noted. At about 60° C. there will be a tendency for sludge to cake on the walls of the heating equipment of the like of the apparatus. Furthermore, if the temperatures approach or exceed 100° C., many microorganisms in the mixture will be killed, thus, severely impairing the digestive process which takes place in the aeration zone.

It is possible to provide heating mechanisms both in the aeration zone and in the clarification zone to maintain a uniform temperature throughout the apparatus. However, it has been found that it is only necessary to provide a heating mechanism in the aeration zone. Once the aerated mixture has reached the desired temperature, it will remain substantially the same temperature during sedimentation since little heat loss occurs between the aeration and the sedimentation zones. Heat loss is minimized, due to the fact that there is constant circulation of sewage and sludge between the two zones and the sedimentation zone is located directly adjacent the aeration with a common wall or partition therebetween. Thus the mixture need not be carried any substantial distance from the source of heat and since the aeration and the sedimentation zones have a common partition as the partition becomes warm due to the temperature of the sewage mixture circulating in the aeration zone, it will conduct heat into the sedimentation zone thereby maintaining a relatively uniform temperature. Thus, a heater is not needed in the sedimentation zone.

Heating of the sewage while in the aeration zone can be accomplished by any one of the many heaters or heat exchange apparatus known to those skilled in the art. Heating coils can be employed as well as strap heaters fixed to the walls of the apparatus. One possibility is to add the heat to the sewage mixture by introducing hot air into the aeration zone. This can be conveniently done since air is ordinarily introduced into the aeration zone to promote the growth of aerobic microorganisms.

In the preferred embodiment of this invention, the temperature is maintained in the desired range by a heat exchanger. The heat exchanger preferably comprises a plurality of heat exchange coils for the circulation of a heated fluid, such as steam, therethrough. The coils are located in the aeration zone and are enclosed within a chamber within the aeration zone. The chamber is filled with a heat conducting medium such as glycol. The glycol in the chamber is heated by the coils and a uniform temperature is maintained. Heat is exchanged through the wall of the glycol containing chamber, to the sewage mixture as it circulates around the chamber within the aeration zone.

The details of the sewage treatment apparatus and process of this invention can be best understood by reference to FIGS. 1 through 5 of the drawings. In FIG. 1 a sewage treatment apparatus in accordance with this invention is shown. It comprises a generally rectangular partitioned tank 1 disposed on a platform 2. In addition to the tank 1, the platform 2 supports two pumps 4 and an air blower assembly 5. The platform 2 is hollow and several portions of the treatment apparatus such as a sump 6, a drain valve 7, and several lines are housed within the platform.

Raw sewage enters the apparatus through influent line 10. Under normal conditions, the sewage proceeds through branch line 12 to a T-coupling 14, thence through a valve 17 and a pipe 13 into a comminutor 18.

The comminutor has a cutting mechanism (not shown) driven by a gear motor 20. The cutting mechanism of the comminutor reduces all solid material in the sewage to a small size that is suitable for treatment.

From the comminutor 18 the sewage mixture passes through valve 19 and line 22 into the aeration chamber 31 of the tank 1. If the sewage entering the influent line 10 is of a nature such that it need not initially be passed through a comminutor, the valve 17 can be closed and sewage can proceed directly from the influent line 10, via a line 23 and an open valve 24, into the aeration zone 31 of the tank 1. A bar screen basket 25 is located within the tank 1 at the inlet adjacent the valve 24, to receive the influent sewage as it enters the tank. The bar screen basket traps any large particles which may be carried with the sewage and which are not susceptible of being broken up and processed within the tank. The bar screen basket is removable from the tank 1 so that it may be periodically cleaned to remove trapped material, via a hatch 26 in the top of the tank.

If the operation of the sewage treatment apparatus must be shut down for a time, the valves 17 and 24 can both be closed and sewage can be pumped from the influent line 10 through the T-coupling 14 directly into an effluent holding chamber 30 within the tank 1, via a valve 27 and bypass line 28.

As fluid enters the tank 1, either from the comminutor via line 22 or through the bar screen basket 25, it enters the aeration chamber 31. The aeration chamber 31 is generally rectangular and is the largest compartment in the tank 1. The influent sewage mixture in the aeration chamber is aerated and caused to circulate in the aeration zone due to the force of a stream of air introduced under pressure into the aeration chamber and of a flow volume of 3 s.c.f.m. per foot of tank length, through an air diffusor 32 located at the base of the chamber. The air diffusor consists of a pipe having a plurality of holes therein for the passage of the air therethrough. The pipe communicates with a blower assembly 5 on the platform through a pipe 33 extending through the platform 2. The air diffusor is located generally at one side of the aeration chamber 31 and as air enters it rises and creates a swelling or circulating motion in the zone from bottom to top in a counterclockwise direction (as viewed in FIG. 1). The volume of flow and the pressure creates a vigorous aeration which creates turbulent forces of high Reynolds numbers which reduce any remaining solid sewage particles in size. The aeration also, of course, promotes the growth of aerobic bacteria in the sewage mixture which digest the sewage and reduce the BOD thereof.

The means for maintaining the sewage at the desired temperature comprises a heat exchanger 36 which is located near the base of the aeration zone chamber and extends centrally from front to back thereof. The heat exchanger is located in the circulation path of the sewage mixture within the aeration chamber. Thus, the circulating sewage mixture is brought into contact with the heat exchanger and the temperature of the sewage is maintained substantially uniform throughout the chamber.

The heat exchanger 36 comprises a fluid filled chamber 38 having a steam coil 37 therein. The steam coil 37 can be fed with steam with any source of steam available aboard the vessel.

The steam is circulated through the steam coil by means of inlet and outlet pipes 38 which extend from the front of the tank 1. The fluid medium 39 which fills the heating chamber 38 is glycol, which distributes the heat of the steam coil uniformly throughout the chamber 38. The glycol is generally heated to a temperature of about 60 to 70° C. which is sufficient to heat sewage circulating around the heating chamber and passing over the walls thereof in the aeration chamber to a temperature of about 45° C. This temperature provides improved biological activity and accelerates the endogenous digestion of the microorganisms thus retarding sludge buildup.

Adjacent the aeration chamber in the tank 1 is a sedimentation chamber 43. The sedimentation chamber 43 is separated from the aeration zone by a partition 40. The partition 40 extends across the tank from front to back. One portion 40b of the partition 40 defines a wall of an effluent holding tank 30 within the tank and the other portion 40a of the partition defines the common wall between the aeration and sedimentation chambers. The effluent holding tank 30 is separated from the sedimentation chamber 43 by a partition 42 which extends perpendicularly from the partition 40 to the side wall of the tank 1. The portion 40a of the partition 40 defines a weir 44 between the aeration zone and the sedimentation zone. The weir 44 can best be seen by reference to FIG. 4. Sewage passes from the aeration chamber 31 at a rate equal to the average sewage input rate, through the weir 44 defined by the top of the partition 40a and through a channel defined between the partition 40a and a wall segment 45 extending downwardly from the top of the tank. Sewage passes downwardly under the wall 45 and then is directed by a baffle 47 extending from the partition 40a into the sedimentation chamber 43. The mixed liquor enters a quiescent area in the sedimentation chamber and suspended microorganisms settle from the suspension to the bottom of the chamber leaving a clarified effluent at the top thereof.

The base of the sedimentation chamber is formed into a trough by slanted walls 46 on two sides of the chamber. These walls 46 assist movement of the particles which settle out of the suspension downwardly along the walls of the sedimentation chamber to the bottom of the zone to form a sludge slurry.

The circulation of the warm sewage and sludge between the aeration zone and the heat conducted through the common partition 40a helps maintain the sewage temperature in the fluid in the sedimentation zone at approximately 45° C. Due to the elevated temperature in the sedimentation zone, the viscosity of the fluid is kept low and rapid sedimentation of the particles is facilitated.

The sludge is collected on the base of the sedimentation zone and is removed therefrom by an air-lift mechanism 48 which pumps from the base of the sedimentation zone and returns it to the aeration zone. The sludge is delivered at the top of the circulation path of the sewage in the aeration zone, to maintain and activate the biological life in the aeration zone. The rate at which sludge is returned to the aeration zone is dependent upon the input rate of sewage into the sedimentation zone. The aeration zone and the sedimentation zone are hydraulically balanced and the flow from the aeration zone into the sedimentation zone and flow from the sedimentation zone both back to the aeration zone and to the effluent line is dependent upon the average sewage input rate.

From the sedimentation chamber clarified fluid from the top thereof flows over an overflow through 49 into a chlorination tank 50. Chlorine is fed in a measured amount through a line 52 into the chlorination tank by a chlorine feed pump 51 to kill remaining microorganisms in the effluent to reach a level below 1,000 coliforms/100 ml. m.p.n. The chlorination tank is formed with a plurality of baffles 50 to ensure that the clarified effluent will be retained within the chlorination tank for a sufficient time for all remaining microorganisms in the effluent to be killed by the chlorine.

After passing by the series of baffles 53, the effluent is free to flow via an overflow trough 54 into the effluent holding tank 30. The clarified fluid remains in the effluent holding tank for a period of 30 minutes before it is pumped from the effluent holding tank through the line 35 by the motor pump 4. A suction pump is provided to draw from the bottom of the effluent holding tank any residue settled in the tank 30. A plurality of level sensors 58 are provided in the effluent holding zone. These sensors comprise electrodes which are suspended at different heights to determine the level of fluid in the effluent holding zone. The electrodes control the operation of the pumps 4. The pumps 4 operate independently of each other and can be operated simultaneously or one at a time depending on the volume of sewage to be pumped through the system.

The various control mechanisms are contained in a control panel 60 located at the front of the platform 2. This control panel 60 contains the necessary electrical switches and the like to control the operation of the various pumps and valves, the air-life, and blower mechanisms, the chlorine feed pump, the heat exchanger, the comminutor and the like.

In normal operation, sewage passes into the influent line 10, through the line 12 in the T-coupling 14, through the valve 17, the line 13 and into the comminutor. The solid sewage particles are reduced in size in the comminutor and pass through the valve 19 and the line 22 into the aeration chamber 31. The sewage is subjected to vigorous aeration in the aeration chamber 21 by the flow of air through the air diffuser 36 from the blower 5. The air flow causes the sewage mixture in the aeration zone to circulate around the heating chamber 38. The sewage mixture is heated to a temperature of 45° C. by the heated glycol 39 within the chamber 38 and is maintained by the heat exchanger at a temperature of about 45° C. A portion of the heated sewage mixture is continuously passed at a rate about equal to the average sewage input rate into the sedimentation chamber 43 over weir 44 in the common partition 40 between the sedimentation zone and the aeration zone. Sedimentation takes place in the sedimentation chamber while the mixture is at an elevated temperature. The relatively large particles settle to the bottom of the chamber forming a sludge slurry leaving a clarified effluent at the top. The clarified effluent is drawn off over an overflow trough into the chlorination tank 50 where it is chlorinated to kill the remaining bacteria. The sludge slurry at the base of the sedimentation chamber is returned to the aeration zone by the air lift and fed into the circulation path of the sewage mixture in the aeration zone to form an activated sludge.

The clarified effluent after passing through the chlorinating tank and by and around the baffles therein for 30 minutes, then passes into the effluent holding tank where it is retained for a short period until pumped from the assembly.

The entire cycle time is approximately 8 hours and the clarified effluent has a minimum 80% reduction in BOD and a coliform count of less than 1000/100 ml. m.p.n. There was no significant buildup of the established mass of suspended microorganisms during the process. The sewage treatment apparatus and process described above are highly efficient and are capable of processing more than 4 gallons per day per cubic foot of space occupied. The apparatus is extremely compact, for example, the apparatus described above occupies only 162 cubic feet for a 600 gallon per day capacity.

Although the preceding discussion is in particular reference to the application of the described sewage treatment process and apparatus for a marine vessel, the instant process and apparatus are particularly suitable for use under any circumstances where space limitations are a significant factor such as in an apartment house.

Having regard to the foregoing disclosure, the following is claimed as the inventive and patentable features thereof:

1. A sewage treatment process capable of processing 4 gallons of sewage per day per cubic foot of processing space occupied, and suitable for use on board a marine vessel, which comprises, comminuting influent sewage so as to reduce the solid sewage particles therein to a size that can be digested in a heated aeration zone, aerating the sewage mixture in an aeration zone and circulating the sewage mixture within the zone by introducing air into the zone in a sufficient volume so as to cause turbulence in the sewage mixture to further reduce the solid particle size, and in a direction so as to cause the sewage mixture to move in a circulating flow path about a heated chamber in the zone, thereby heating the mixture by impingement of the circulating sewage mixture on the walls of the chamber to an elevated temperature within the range of from about 35° C. to about 55° C. to promote the growth of microorganisms therein and substantially reduce the BOD of the mixture; withdrawing a portion of said mixture and transferring the withdrawn portion into a clarification zone and clarifying said portion of the mixture while at an elevated temperature within said range by sedimenting out from the mixture in the form of slude the suspended microorganisms in the mixture leaving a clarified effluent; drawing off the clarified effluent from the sedimentation zone; collecting sludge separated from said clarified effluent during sedimentation; recirculating at least a portion of said sludge into the aeration zone; and disinfecting said clarified effluent.

2. A sewage treatment process in accordance with claim 1, in which air is introduced into the aeration zone at a rate of at least 3 s.c.f.m. per foot of tank length to aerate the sewage mixture and cause said circulation.

3. A sewage treatment process in accordance with claim 1, in which the portion of the sewage mixture withdrawn from the aeration zone is transferred into an adjacent upper and quiescent portion of the sedimentation zone.

4. A sewage treatment process in accordance with claim 1, in which the sewage mixture is maintained at an elevated temperature within the range of about 40° C. to about 50° C.

5. A sewage treatment process in accordance with claim 1, in which the sewage processing time is about 8 hours.

6. A sewage treatment process in accordance with claim 1, in which the effluent is disinfected by dispensing a predetermined amount of disinfectant into a disinfectant tank and passing the clarified effluent through the tank for a sufficient detention time such that the clarified effluent has a viable microorganism count of less than about 1000 per about 100 ml. m.p.n.

7. A sewage treatment apparatus capable of treating 4 gallons of sewage per day per cubic foot of space occupied, and suitable for use on board a marine vessel, which comprises, in combination, a housing; an aeration chamber in the housing for receiving a quantity of sewage; means for introducing air under pressure into the aeration chamber to aerate the sewage mixture and circulate the sewage in the chamber; heat exchange means for heating the aerated sewage mixture in the aeration chamber to an elevated temperature within the range from about 35° C. to about 55° C. to promote the growth of microorganisms in the mixture and reduce the BOD of the mixture, said heat exchange means comprising a liquid filled chamber disposed within the aeration chamber in a position in the chamber so that the circulating sewage mixture impinges on the surface of the liquid filled chamber and heating means positioned within the liquid filled chamber for heating the liquid therein; a sedimentation chamber in the housing adjacent to the aeration chamber for the separation from the mixture of the suspended microorganisms therein in the form of sludge while the mixture is at an elevated temperature leaving a clarified effluent; said sedimentation chamber communicating with the aeration chamber in a manner to receive a portion of the heated aerated sewage mixture therefrom with a minimum of heat loss; means for recirculating the sludge separated from the effluent in the sedimentation chamber to the aeration chamber; means for withdrawing the clarified effluent from the sedimentation chamber; and means for disinfecting the clarified effluent for discharge.

8. A sewage treatment apparatus in accordance with claim 7, in which the heating means within the chamber is a steam coil.

9. A sewage treatment apparatus in accordance with claim 7, in which the means for introducing air under pressure to the aeration chamber comprises a blower and an air diffuser, said air diffuser being positioned within the aeration zone and in relation to the heat exchange means so as to move the sewage mixture in a circulating flow path about the heat exchange means.

10. A sewage treatment apparatus in accordance with claim 7, including a comminutor positioned in the line of sewage flow to receive influent sewage prior to its entrance into the aeration chamber for reducing in size the solid material contained in the sewage mixture.

11. A sewage treatment apparatus in accordance with claim 7, in which the means for disinfecting the clarified effluent for discharge comprises a chlorination tank positioned to receive the clarified effluent from the sedimentation chamber, and a chlorine feed pump communicating with the chlorination tank and adapted to dispense a predetermined amount of chlorine into the tank, said chlorination tank having a plurality of baffles therein, said baffles being adapted to detain the sewage in the chlorination tank for a period of time sufficient to ensure that the clarified effluent is disinfected due to the action of the chlorine.

12. A sewage treatment apparatus in accordance with claim 7, including an effluent holding tank disposed adjacent to the chlorination tank and adapted to receive chlorinated effluent therefrom and hold such chlorinated effluent prior to being discharged.

13. A sewage treatment apparatus in accordance with claim 7, in which the heat exchange chamber is positioned generally centrally in the aeration chamber and the means for introducing air under pressure is positioned at a wall of the aeration chamber.

14. A sewage treatment apparatus capable of treating 4 gallons of sewage per day per cubic foot of space occupied and suitable for use on board a marine vessel which comprises, in combination, a housing; an aeration chamber in the housing for receiving a quantity of sewage; heating means comprising a heat exchange enclosure positioned within and extending across the aeration chamber for heating the sewage mixture in the aeration chamber to an elevated temperature within the range from about 35° C. to about 55° C. to promote the growth of microorganisms in the mixture and reduce the BOD of the mixture; means for introducing air under pressure into the aeration chamber to aerate the sewage mixture including an air diffuser disposed in the aeration chamber, said air diffuser being adapted to introduce air into the aeration chamber at a rate of at least 3 s.c.f.m. per foot, so as to cause turbulence in the sewage mixture and being positioned in relation to the heat exchange enclosure so as to cause the sewage mixture in the aeration chamber to move in a circulating flow path about the heat exchange enclosure to uniformly heat the sewage mixture to said elevated temperature as it impinges on the surface of the enclosure; a sedimentation chamber in the housing adjacent to the aeration chamber, for the separation from the mixture in the form of sludge of the suspended microorganisms therein while the mixture is at en elevated temperature leaving a clarified effluent; transfer means connecting the aeration chamber with an adjacent upper portion of the sedimentation chamber and opening into a quiescent portion of the sedimentation chamber so as to permit the aerated sewage mixture to enter the sedimentation chamber without disrupting the settling of the microorganisms; means for recirculating at least a portion of the sludge in the sedimentation chamber to the aeration chamber; means for withdrawing the clarified effluent from the sedimentation chamber; and means for disinfecting the clarified effluent for discharge.

15. A sewage treatment apparatus in accordance with claim 14, in which the transfer means comprises an overflow weir defined at least in part, by a common wall of the sedimentation chamber and the aeration chamber.

16. A sewage treatment apparatus in accordance with claim 14, in which the heat exchange enclosure comprises a liquid filled chamber positioned centrally in the aeration chamber and having a steam coil positioned therein for heating the liquid in the chamber.

17. A sewage treatment apparatus in accordance with claim 16, in which the means for introducing air into the aeration chamber comprises a blower communicating with the air diffuser, and in which the air diffuser is positioned at a wall of the aeration chamber.

18. A sewage treatment apparatus capable of treating 4 gallons of sewage per day per cubic foot of space occupied and suitable for use on board a marine vessel, comprising, in combination, a partitioned sewage treatment tank, said tank having an inlet and an outlet; a first partition in said tank extending across said tank between said inlet and said outlet and defining with the sides of the tank an aeration chamber; a comminutor associated with said tank and disposed in position to receive the influent sewage flow and being adapted to reduce solid sewage material to a size such that it can be digested in the aeration chamber, said comminutor communicating with said inlet in a manner to introduce said sewage material into said aeration chamber; aeration means comprising an air diffusor disposed within the aeration chamber in proximity to the base and a side thereof in a manner to circulate the sewage within the aeration chamber said aeration means being adapted to introduce air at a rate of about 3 s.c.f.m. per foot of tank length into the aeration chamber to cause turbulence in the sewage mixture in the aeration chamber threreby reducing the particle size of the solid sewage material and promoting the growth of bacteria and biological oxidation of the sewage within the chamber; heat exchange means disposed within and extending across the aeration chamber, said heat exchange means comprising a heat exchange chamber adapted to contain a heat exchange fluid for uniformly distributing heat throughout the chamber, and heat exchange means extending within the chamber for heating the heat exchange fluid thereby maintaining an elevated temperature in the chamber, said heat exchange means being positioned in the aeration chamber, in the path of sewage circulation, such that the sewage mixture is circulated over and by the surface of the heat exchange chamber to uniformly heat it to a temperature within the range from about 40° C. to about 50° C.; a second partition in the tank extending from the first partition to a wall of the tank, said second partition defining with the first partition and at least two walls of the tank a sedimentation chamber within the sewage treatment tank adjacent to the aeration chamber, said first partition forming a common wall of both the aeration chamber and the sedimentation chamber, and said common wall having a transfer means at the top thereof for continuously drawing off a portion of the sewage mixture in the aeration chamber at a rate about equal to the average sewage input rate and transferring it into the sedimentation chamber, said sedimentation chamber being adapted to receive and collect suspended microorganisms on the bottom of said sedimentation chamber to form a sludge leaving a clarified effluent at the top of the chamber; pump means for withdrawing the sludge from the base of the sedimentation chamber and recirculating it into the aeration chamber; a third partition extending from the second partition to a wall of the tank and dividing the remaining portion of the sewage treatment tank into two chambers; the first chamber comprising a disinfecting chamber which communicates with the sedimentation chamber via an overflow means, said disinfecting chamber having a series of baffles therein to slow the passage of sewage therethrough; the second chamber comprising an effluent holding tank adapted to receive the effluent from the disinfecting chamber and hold said effluent prior to its discharge from the tank, said effluent holding chamber communicating with the outlet for the discharge of the effluent from the apparatus; a disinfectant feed pump adapted to dispense a predetermined amount of disinfectant into the disinfectant chamber to disinfect the sewage therein; and pump means for circulating the sewage into and through the apparatus and withdrawing the effluent from the apparatus.

19. A sewage treatment apparatus capable of treating 4 gallons of sewage per day per cubic foot of space occupied and suitable for use on board a marine vessel, comprising, in combination, a generally rectangular partitioned sewage treatment tank, said tank having an inlet and an outlet; a first partition in said tank extending across said tank between said inlet and said outlet and defining with three sides of the tank an aeration chamber; a comminutor associated with said tank and disposed in position to receive the influent sewage flow and being adapted to reduce solid sewage material to a size such that it can be digested in the aeration chamber, said comminutor communicating with said inlet in a manner to introduce said sewage material into said aeration chamber; aeration means comprising a blower, and an air diffusor communicating with the blower, and disposed within the aeration chamber in proximity to the base and a side thereof in a manner to circulate the sewage within the aeration chamber from bottom to top of the aeration chamber, said aeration means being adapted to introduce air at a rate of 3 s.c.f.m. per foot of tank length into the aeration chamber to cause turbulence in the sewage mixture in the aeration chamber thereby reducing the particle size of the solid sewage material and promoting the growth of bacteria and biological oxidation of the sewage within the chamber; heat exchange means disposed generally centrally within and extending across the aeration chamber, said heat exchange means comprising a heat exchange chamber adapted to contain a heat exchange fluid for uniformly distributing heat throughout the chamber, and heating means extending within the chamber for heating the heat exchange fluid thereby maintaining an elevated temperature in the heat exchange chamber, said heat exchange means being positioned in the aeration zone, in the path of sewage circulation, such that the sewage mixture is circulated over and by the surface of the heat exchange chamber to uniformly heat it to a temperature within the range from about 40° C. to about 50° C.; a second partition in the tank extending perpendicularly from the first partition to a wall of the tank, said second partition defining with the first partition and two walls of the tank and a sedimentation chamber within the sewage treatment tank adjacent to the aeration chamber, said first partition forming a common wall of both the aeration chamber and the sedimentation chamber, and said common wall having a transfer means at the top thereof for continuously drawing off a portion of the sewage mixture in the aeration zone at a rate about equal to the average sewage input rate and transferring it into the sedimentation zone, said sedimentation zone having at least two inclined wall portions adapted to assist the sedimentation of suspended microorganisms to the bottom of said sedimentation chamber to form a sludge leaving a clarified effluent at the top of the chamber; pump means for withdrawing the sludge from the base of the sedimentation chamber and recirculating it into the aeration zone; a third partition extending perpendicularly from the second partition to a wall of the tank and dividing the remaining portion of the sewage treatment tank into two chambers; the first chamber comprising a disinfecting chamber which communicates with the sedimentation chamber via an overflow means, said disinfecting chamber having a series of baffles therein to slow the passage of sewage therethrough; the second chamber comprising an effluent holding tank adapted to receive the effluent from the disinfecting chamber and hold said effluent prior to its discharge from the tank, said effluent holding chamber communicating with the outlet for the discharge of the effluent from the apparatus; a disinfectant feed pump adapted to dispense a predetermined amount of disinfectant into the disinfectant chamber to disinfect the sewage therein; and pump means for circulating the sewage into and through the apparatus and withdrawing the effluent from the apparatus.

References Cited

UNITED STATES PATENTS

| | | | |
|---|---|---|---|
| 2,709,680 | 5/1955 | Watson | 210—152 X |
| 3,347,784 | 10/1967 | Kappe | 210—7 X |
| 3,379,311 | 4/1968 | Kulka | 210—152 X |

FOREIGN PATENTS 652,585  11/1962  Canada.

MICHAEL E. ROGERS, Primary Examiner

U.S. Cl. X.R.

210—12, 14, 64, 177, 195, 221